Sept. 27, 1960  E. G. B. CROOK  2,953,836
CLIPS FOR FORMWORK
Filed Sept. 10, 1956
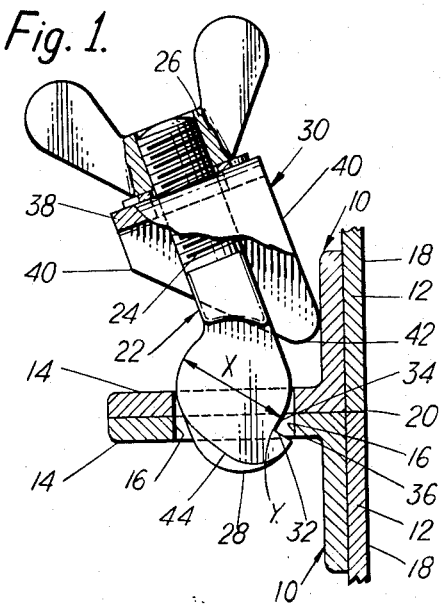
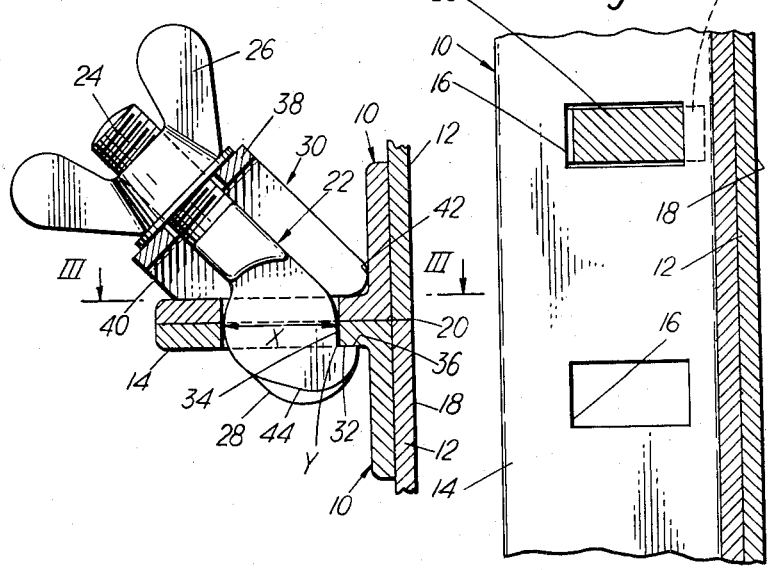
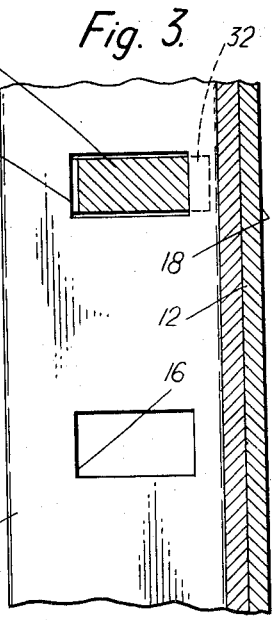
Inventor
Eric George Benjamin Crook
By
Dowell N Dowell
Attorneys

United States Patent Office 2,953,836
Patented Sept. 27, 1960

2,953,836

CLIPS FOR FORMWORK

Eric George Benjamin Crook, Osterley, England, assignor to Acrow (Engineers) Limited, London, England Filed Sept. 10, 1956, Ser. No. 608,944

Claims priority, application Great Britain Sept. 20, 1955

5 Claims. (Cl. 25—131)

This invention relates to equipment for use in casting concrete walls and the like.

In one very effective modern system of formwork, the faces defining the cavity in which the concrete is to be cast are defined by rectangular panels placed alongside each other and connected together by clips passing through registering slots formed transversely in flanges bounding the vertical edges of the panels. From time to time, the shuttering formed by the panels is built upwards by means of further similar panels, the panels in successive rows being connected together by further clips passing through slots in the horizontal flanges of the panels.

The invention is concerned with clips for use with panels of the kind set forth above.

The faces of the panels must be reasonably accurately aligned with those of their horizontal and vertical neighbours or the face of the concrete wall will be stepped. Also, there must be no gap between neighbouring flanges or the concrete wall will have unsightly flashes. The clips are largely relied on for these purposes and as they must be cheap to manufacture and easy to use, they are important items of equipment.

The clip in accordance with the invention has been designed with those considerations in mind.

One of the weaknesses of the clips now in use is that, while they are designed to press the flanges of neighbouring panels together, the point of application of the pressure is either at the outer edges of the flanges or, at all events, too far from the roots of the flanges to ensure that the flanges are close together where that condition is most necessary, namely, at the shuttering face.

The clip in accordance with the invention clamps the flanges of the panels together in the neighbourhood of their roots. It comprises a bolt having a nut at one end, a sliding member on its shank and a head which can be caused to pass through a pair of aligned slots in the flanges of the panels and to bring one bounding surface of a step with which it is formed into contact with the free surface of the flange at the exit side so that the flanges can be clamped together between that surface and the sliding member by tightening the nut, the head being shaped so that when the step is in the clamping position, the head substantially fills the slots lengthwise so as to prevent any material misalignment of the working faces of the panels.

In the preferred form of the invention, the axis of the bolt is, in the clamping position, inclined to the plane of the working faces of the panels and the sliding member, which is of channel cross-section, is bevelled so as to lie flat on one of the faces.

The preferred form of clip is shown by way of example in the accompanying drawings and will now be described in detail with reference thereto.

In the drawings:

Figure 1 shows the clip about to be engaged in the slots in a pair of flanges;

Figure 2 shows the clip in full engagement; and

Figure 3 is a section taken on the line III—III in Figure 2.

The drawings show the marginal angle section framing 10 of two formwork panels 12. The flanges 14 of the framing are provided with transverse rectangular slots 16 which must be aligned in order to bring the working faces 18 of the panels in proper alignment. It will be appreciated that any misalignment or any gap at the junction 20 of the panels will result in a blemish in the face of any concrete mass which is cast in a space bounded by the panels.

The clip 22 used for the purpose of clamping the panels in the appropriately aligned position and correcting any minor misalignment comprises a bolt 24 having a nut 26 at one end, a head 28 at the other and a sliding member 30 on its shank.

The head 28 is formed with a step having bounding faces 32, 34 at right angles to each other. It is shaped so that it can be passed through the slots 16 as shown in Figure 1 into the position shown in Figure 2 in which the surface 32 of the step bears against the free face 36 of the flange 14 on the exit side.

In the position of Figure 2, the head 28 substantially fills the slots 16 lengthwise, the dimension X shown in Figure 1 being only very slightly shorter than the length of the slots.

In that position also, the axis of the bolt 24 is inclined to the working face 18 of the panels. As shown in the drawing, it is at 45° thereto.

The sliding member 30 is of channel cross-section, the shank of the bolt passing through its base 38. The legs 40 of the channel are bevelled at 45° so that in the working position shown in Figure 2, their end faces lie flat on the top flange 14. By screwing down the nut 26, the flanges 14 are clamped together between the surface 32 of the step on the head of the bolt and the bevelled ends of the sliding member 30. It will be seen that the clamping pressure is applied in the neighbourhood of the roots of the flanges 14 and, therefore, that the panels will be brought close together along the line 20. It will be appreciated that if the clamping pressure is applied to the flanges near their free edges, there is a danger of the flanges being sprung apart at their roots.

Also, as the slots are substantially filled lengthwise, there can be no material misalignment of the working faces 18. Indeed, if the slots are not initially accurately aligned, they can be brought into alignment by the tightening of the nut 26.

It will also be seen that the acute ends 42 of the bevelled ends of the legs of the sliding member 30 are located in the angle of the flanges. This facilitates the insertion of the clip into the slots and also the passage from the position of Figure 1 to that of Figure 2. Also, because of their abutment against the flanges, they provide a reaction point which assists in the final tightening of the nut 26.

The head of the bolt is eased as shown at 44 to facilitate insertion in the slots.

To enable the head to be inserted and its step to be brought into the working position (Fig. 2), the radial distances from the point Y to the surface of the head must be smaller than the distance X, that is to say, the length of the slots.

Although the drawings show formwork panels consisting of panels proper framed with members of angle section, it is, of course, clear that the invention can be applied to panels having integral flanges and to angle frame works intended to receive panels of timber or any other material.

The clip shown and described is cheap to manufacture and easy to use. It can usefully be made of high grade mild steel.

I claim:

1. A combination having juxtaposed panels each joined by flanges extending away from the working faces of the panels and having transverse slots therein, a clip for clamping together two said panels and comprising a bolt, a nut at one end of said bolt, a sliding member on the shank of said bolt, a head at the other end of said bolt which head is adapted to pass through a pair of aligned slots in the said flanges of the panels, and a step formed in one side of said head the maximum distance from the inner edge of the step to any point on the surface of the head opposite said step being less than the length of said slots, said step having a bounding surface constituting a clamping face for engaging the free surface near the root of the flange at the exit side of the aligned slots whereby to clamp the flanges at their roots between the said clamping face and the said sliding member upon tightening the nut, the said head on the bolt having a shape so that it substantially fills the width, length and depth of the slots when the step is in the clamping position whereby to prevent any material misalignment of the said working faces of the panels.

2. A combination having juxtaposed panels each joined by flanges extending away from the working faces of the panels and having transverse slots therein, a clip for clamping together two said panels and comprising a bolt, a nut at one end of said bolt, a sliding member of channel cross-section on the shank of said bolt, the bolt passing through an aperture in the base of the channel, a head at the other end of said bolt, which head is adapted to pass through a pair of aligned slots in the said flanges of the panels, and a step formed in one side of said head the maximum distance from the inner edge of the step to any point on the surface of the head opposite said step being less than the length of said slots, said step having a bounding surface constituting a clamping face for engaging the free surface near the root of the flange at the exit side of the aligned slots whereby to clamp the flanges at their roots between the said clamping face and the said sliding member upon tightening the nut, the said head on the bolt having a shape so that it substantially fills the width, length and depth of the slots when the step is in the clamping position whereby to prevent any material misalignment of the said working faces of the panels.

3. A clip according to claim 1 in which, in the clamping position, the axis of the bolt is inclined to the working face of the panels.

4. A clip according to claim 3 in which the clamping face of the sliding member is inclined to the axis of the bolt so as to lie flat on one of the flanges in the clamping position.

5. A clip according to claim 1 in which the sliding member abuts in the clamping position against one of the flanges at the root thereof and is pressed thereagainst by the nut.

References Cited in the file of this patent

UNITED STATES PATENTS

| | | |
|---|---|---|
| 1,123,361 | Edison | Jan. 5, 1915 |
| 1,358,688 | Lyon | Nov. 9, 1920 |
| 1,502,508 | Longley | July 22, 1924 |
| 1,552,334 | Mosher | Sept. 1, 1925 |
| 1,621,563 | Stevens | Mar. 22, 1927 |
| 1,734,343 | Prentice | Nov. 5, 1929 |
| 1,958,497 | Rivers | May 15, 1934 |
| 2,693,628 | Hummel | Nov. 9, 1954 |
| 2,693,691 | Pasanen | Nov. 9, 1954 |